(12) United States Patent
Harris et al.

(10) Patent No.: US 6,713,031 B2
(45) Date of Patent: Mar. 30, 2004

(54) STRUCTURED CATALYSTS FOR SELECTIVE REDUCTION OF NITROGEN OXIDES BY AMMONIA USING A COMPOUND THAT CAN BE HYDROLYZED TO AMMONIA

(75) Inventors: Michael Harris, Münster (DE); Jürgen Leyrer, Rheinfelden (DE); Yvonne Demel, Frankfurt am Main (DE); Egbert Lox, Hanau (DE); Thomas Kreuzer, Karben (DE)

(73) Assignee: DMC2 Degussa Metal Catalysts Cerdec AG, Frankfurt am Main (DE)

( * ) Notice: Subject to any disclaimer, the term of this patent is extended or adjusted under 35 U.S.C. 154(b) by 196 days.

(21) Appl. No.: 09/851,417

(22) Filed: May 9, 2001

(65) Prior Publication Data

US 2002/0025905 A1 Feb. 28, 2002

(30) Foreign Application Priority Data

May 10, 2000 (DE) .......................... 100 22 842

(51) Int. Cl.[7] .............................. B01J 8/00; C01B 21/00
(52) U.S. Cl. .................... 423/239.1; 423/237; 423/238; 423/239.2
(58) Field of Search .......................... 423/213.2, 239.1, 423/239.2, 238, 237

(56) References Cited

U.S. PATENT DOCUMENTS

| | | | | |
|---|---|---|---|---|
| 5,139,754 A | * | 8/1992 | Luftglass et al. ............ | 423/235 |
| 5,281,403 A | * | 1/1994 | Jones ....................... | 423/235 |
| 5,591,414 A | * | 1/1997 | Jacob et al. ................ | 422/180 |
| 6,063,350 A | * | 5/2000 | Tarabulski et al. ......... | 423/239.1 |
| 6,173,568 B1 | * | 1/2001 | Zurbig et al. ............... | 60/274 |
| 6,192,676 B1 | * | 2/2001 | Zurbig et al. ............... | 60/286 |
| 6,294,140 B1 | * | 9/2001 | Mussmann et al. ......... | 423/213.5 |
| 6,334,986 B2 | * | 1/2002 | Gieshoff et al. ............ | 423/239.1 |
| 6,361,754 B1 | * | 3/2002 | Peter-Hoblyn et al. ..... | 423/213.2 |
| 6,444,177 B1 | * | 9/2002 | Muller et al. ............... | 422/177 |

FOREIGN PATENT DOCUMENTS

| | | |
|---|---|---|
| DE | 197 42 705 | 4/1998 |
| DE | 197 31 865 | 2/1999 |
| DE | 197 38 737 | 3/1999 |
| EP | 0 716 876 | 6/1996 |

OTHER PUBLICATIONS

European Search Report for corresponding European appln. No. EP 01 10 9984 dated Sep. 3, 2001.

\* cited by examiner

*Primary Examiner*—Stanley S. Silverman
*Assistant Examiner*—Jonas N. Strickland
(74) *Attorney, Agent, or Firm*—Kalow & Springut LLP

(57) ABSTRACT

A structured catalyst for selective reduction of nitrogen oxides with ammonia using an ammonia-supplying compound. The catalyst is preferably used for exhaust gas treatment of diesel vehicles powered by diesel motors. The catalyst is characterized by the fact that it contains a reduction catalyst for selective reduction of nitrogen oxides with ammonia and a hydrolysis catalyst for the hydrolysis of urea, where the hydrolysis catalyst is applied in the form of a coating onto the reduction catalyst. By this arrangement of the two catalytic functions in one catalyst the exhaust gas system can be made very compactly and space saving. Moreover, advantageous synergistic effects result from the direct contact of the hydrolysis catalyst and the reduction catalyst.

21 Claims, 1 Drawing Sheet

STRUCTURED CATALYSTS FOR SELECTIVE REDUCTION OF NITROGEN OXIDES BY AMMONIA USING A COMPOUND THAT CAN BE HYDROLYZED TO AMMONIA

INTRODUCTION AND BACKGROUND

The present invention relates to a structured catalyst for selective reduction of nitrogen oxides found in the lean exhaust gas stream of a combustion engine by ammonia while using a compound that can be hydrolyzed to ammonia. The catalyst is preferably used to treat the exhaust gases of vehicles powered by diesel engines.

Exhaust gases from internal combustion engines, especially from diesel and lean engines (gasoline powered internal combustion engines operated with lean fuel mixtures), contain nitrogen oxides NOx in addition to the pollutants carbon monoxide CO, hydrocarbons HC and particulate matter. In the case of gasoline engines that are run with a stoichiometrically composed air/oxygen mixture a drastic reduction of the emission of pollutants is possible through the use of three-way catalysts. They are capable of reducing the nitrogen oxides present in the exhaust gas to nitrogen while simultaneously oxidizing hydrocarbons and carbon monoxide. A stoichiometrically composed exhaust gas contains approximately 0.7 vol % oxygen. In contrast, diesel engines and lean engines have up to 15 vol % oxygen in the exhaust gas. Because of this high excess oxygen, the nitrogen oxides cannot be reduced with conventional three-way catalysts.

Reducing the nitrogen oxides selectively on a suitable catalyst while adding ammonia is known for converting the nitrogen oxides in exhaust gases that contain excess oxygen. This so called SCR (selective catalytic reduction) process is described, for example, in the European Patents EP 9 376 025 B1 and EP 0 385 164 B1. To reduce the entrainment of ammonia in the vehicle this can be produced by a compound that can be hydrolyzed to ammonia, usually urea, from which ammonia can easily be obtained by hydrolysis. However, this process requires two catalysts, a hydrolysis catalyst and a reduction catalyst.

For instance, DE 40 38 054 A1 describes a method for operating an SCR catalyst to reduce nitrogen oxides that consists of spraying a urea solution onto a heated evaporator and converting it to ammonia and carbon dioxide by means of a hydrolysis catalyst. The ammonia thus obtained is used on the SCR catalyst connected next in line to reduce the nitrogen oxides contained in the exhaust gas. Oxides with solid acid properties that contain titanium dioxide, aluminum oxide, silicon dioxide or mixed phases and compounds of these together as matrix oxide are used as the hydrolysis catalyst, where the acid properties are obtained by adding oxides of pentavalent and hexavalent elements like $SO_3$ and $WO_3$ as stabilizers and to enhance activity.

DE 42 03 807 A1 proposes, for catalytic reduction of nitrogen oxides from oxygen-containing exhaust gases using urea, a device that contain a hydrolysis catalyst that consist of fine flow channels that allow partial flows through passage reversals and penetrations or slots that are directed nearly perpendicular to the main flow. This is intended to bring about uniform distribution of the urea solution and very rapid heating of the solution. In this way the urea solution can be quantitatively converted to ammonia and carbon dioxide without the formation of harmful byproducts.

Mixtures of aluminum oxide with titanium oxide, silicon oxide, zirconium dioxide and/or H zeolites in weight ratios between aluminum oxide and the other oxides from 90:10 to 10:90 are mentioned as suitable active components for the hydrolysis catalyst in DE 42 03 807 A1.

EP 0 615 777 A1 likewise describes a catalyst arrangement of a urea hydrolysis catalyst and SCR catalyst. To obtain ammonia solid urea is used instead of an aqueous urea solution. Another oxidation catalyst is arranged downstream of the SCR catalyst to prevent possible escape of ammonia by oxidizing the ammonia to water and nitrogen.

DE 44 17 238 A1 describes another device for reducing nitrogen oxide in exhaust gas in a combustion engine operated with excess air, which consists of a hydrolysis catalyst, an SCR catalyst and a connected oxidation catalyst.

The SCR catalysts known from EP 0 385 164 B1 have a similar composition to the hydrolysis catalyst. However, they contain additional components that are necessary for the selective catalytic reduction. In accordance with the said patent, the reduction catalysts contain titanium oxide and at last one oxide of tungsten, silicon, boron, aluminum, phosphorus, zirconium, barium, yttrium, lanthanum or cerium and at least one oxide of vanadium, niobium, molybdenum, iron or copper as an additional component. It is these additional components in particular that give the catalyst good reducing properties in oxygen-containing exhaust gases.

It is characteristic for the SCR catalysts that they have a so-called window of activity. For a given volume of the catalyst, i.e., for a load on the catalyst at a specific space velocity, the conversion of the nitrogen oxides takes place optimally only in a limited temperature interval. For the indicated catalyst compositions and space velocities of 50,000 to 100,000 $h^{-1}$ this window lies between approximately 200 and 600° C. and thus roughly corresponds to the exhaust gas temperatures of diesel vehicles. If this window of activity is to be shifted to lower temperatures, the catalyst must additionally be provided with noble metals of the platinum group of the periodic system of elements or be considerably increased in volume, which, however, is only limitedly possible for reasons of space.

A disadvantage with the known catalyst systems for converting the nitrogen oxides in the exhaust gas is that they are quite long because of the two successively connected catalysts. In addition, problems arise in a cold start because of the large thermal mass of the catalyst support, due to which the overall operating system is very slow to reach its operating temperature. The exhaust gas is additionally cooled by the feed of the urea solution. The temperature difference that exists between the hydrolysis catalyst and the reduction catalyst also has an adverse affect on the dynamic conversion behavior of the catalyst system.

An object of this invention is to devise a new catalyst system that enables a shorter length of the structure than traditional systems and moreover has considerably more favorable properties.

SUMMARY OF THE INVENTION

The above and other objects of the present invention can be achieved by a structured catalyst for selective reduction of nitrogen oxides contained in the lean exhaust gas of a combustion engine by means of ammonia using a compound that can be hydrolyzed to ammonia and that is injected into the exhaust gas stream in the form of an aerosol, where the structured catalyst is in the form of a monolithic catalyst body through which a large number of flow paths for the exhaust gas run from an inlet face to an outlet face. It is a feature of the invention that the catalyst contains a reduction catalyst for selective reduction of nitrogen oxides by ammonia and a hydrolysis catalyst for the hydrolysis of the compound that can be hydrolyzed to ammonia, where the hydrolysis catalyst is applied to the reduction catalyst in the form of a coating.

A separate hydrolysis catalyst can be omitted through the arrangement of hydrolysis catalyst and SCR reduction catalyst in direct contact with each other in accordance with the invention. A considerably reduced structure length for the overall catalyst system results from this. The advantages of the invention are, however, not limited just to this geometric factor. Rather, synergistic effects that lead to a better catalytic performance compared to separate catalysts result from the close contact between the hydrolysis catalyst and the reduction catalyst.

In the catalyst in accordance with the invention the reduction catalyst forms the catalyst support for the hydrolysis catalyst. Because of this, a separate catalyst for the hydrolysis catalyst, with its very large thermal mass, is omitted. Thus, after a cold start the catalyst in accordance with the invention reaches its operating temperature, and thus its fall catalytic performance, very much sooner than a separate catalyst.

For the operation of the catalyst in an exhaust gas treatment system the compound that can be hydrolyzed to ammonia, usually urea, has to be supplied to it in an amount sufficient for reduction of the nitrogen oxides. A sufficient amount of urea is present when the ammonia that is formed from it by hydrolysis is in a mol ratio to the nitrogen oxides contained in the exhaust gas from about 0.8:1 to 1.2:1 (see EP 9 385 164 B1). The urea can be injected into the exhaust gas in upstream from the catalyst in the form of an aqueous urea solution, as a solid or in molten form. Methods for dispensing urea into the exhaust gas stream and control of the amount of urea are known from the prior art and are not an object of this invention.

Through the known techniques for adding urea to the exhaust gas stream of a vehicle the urea reaches the catalyst in the form of an aerosol. It is absorbed by the hydrolysis layer and hydrolyzed. The resulting ammonia is formed in direct proximity to the reduction catalyst with locally very high partial pressure and is partially consumed on the spot by the catalyst for the reduction of the nitrogen oxides. The unconsumed part passes into the gas phase of the exhaust gas stream and provides the downstream parts of the catalyst with reducing agent. All in all, the catalyst in accordance with the invention enables a considerably better use of the ammonia. Because a large part of the ammonia does not have to pass into the gas phase of the exhaust gas stream in order to develop its reducing effect, the potential ammonia escape is also reduced and the oxidation catalyst that is optionally arranged downstream of the catalyst is thus omitted.

In many applications the desired effect can be achieved just by coating the face of the body of the reduction catalyst with the hydrolysis catalyst so that the volume of the reduction catalyst is only slightly reduced by the hydrolysis catalyst.

The overall better utilization of the urea with the catalyst in accordance with the invention also reduces the problem of the possible formation of nitrous oxide ($N_2O$) by nonselective oxidation of ammonia on the reduction catalyst itself or by the connected oxidation catalyst, especially at high exhaust gas temperatures, which comes up with the conventional SCR process.

Another advantage of the structured catalyst is that hydrolysis and reduction take place at approximately the same temperature, since there is only a minimal temperature difference between the hydrolysis catalyst and the underlying reduction catalyst. Because of this, the catalyst still provides good reduction results even in a case when with separated catalyst systems the temperature at the reduction catalyst would be below the window of activity of the reduction catalyst because of the temperature difference between the hydrolysis catalyst and the reduction catalyst as a consequence of the selected operating point of the engine. In addition, the hydrolysis catalyst also acts as a protective layer for the underlying reduction catalyst, which is sensitive to the deposition of particulate matter and other contaminants from the exhaust gas and can be impaired, while experience shows that such contaminants have hardly any effect on the activity of the hydrolysis catalyst.

In one particular embodiment of the invention the reduction catalyst can be designed as a so-called complete catalyst, i.e., it consists entirely of catalytically active mass and is obtained, for example, by tabletting or extruding the catalytically active mass or a precursor of it. Preferably, the reduction catalyst is extruded in the form of a honeycomb with parallel channels that form the flow paths for the exhaust gas and are regularly arranged over the cross section of the catalyst body. The flow channels are bounded by channel walls. The hydrolysis catalyst is applied in the form of a coating to the channel walls of the flow channels.

For coating the catalyst body the components of the hydrolysis catalyst are processed to a coating dispersion with which the flow channels are coated by known techniques. The cell density (number of flow channels per square centimeter) of these complete catalysts is approximately between 20 and 100 $cm^{-2}$.

Since the urea is chiefly deposited onto the channel walls in the front part of the honeycomb as the material flows through the honeycomb, it is advantageous to apply the hydrolysis catalyst only in the front part of the reduction catalyst for optimum utilization of it. It is sufficient when the hydrolysis catalyst is applied onto the reduction catalyst only over 10 to 70% of the length of the honeycomb starting from the inlet face.

In a preferred embodiment of the invention the reduction catalyst and hydrolysis catalyst are applied to an inert support in the form of coatings one on top of the other, where the hydrolysis layer lies on the reduction layer and directly contacts the exhaust gas. All of the known forms of catalyst supports are suitable as inert supports, i.e., honeycombs of metal or ceramic with cell densities with 20 to 200 $cm^{-2}$. Also advantageous are mixing structures as catalyst supports such as, for example, the Sulzer mixer, which simultaneously serve for optimum distribution of the urea aerosol, or the released ammonia, over the catalyst cross section.

If honeycombs are used as the support, the measures discussed above for matching the active components to the changing concentrations of urea aerosol, ammonia and nitrogen oxides along the honeycomb can be correspondingly used.

The compositions based on titanium dioxide that are noted in EP 0 385 164 B1 are suitable as SCR catalysts. In particular, the reduction catalyst can contain the following components:

A) titanium dioxide,
B) at least one oxide of tungsten, niobium, molybdenum, silicon, boron, aluminum, phosphorus, zirconium, barium, yttrium, lanthanum or cerium or mixed oxides thereof or mixed oxides with titanium dioxide and C) at least one oxide of vanadium, iron or copper.

Preferably the titanium dioxide is 30 to 100 wt % in the form of the anatase modification with a specific surface of greater than 40 m²/g. For stabilization against high temperature stresses it can be stabilized with 1 to 20 wt % tungsten oxide, molybdenum oxide, silicon dioxide or lanthanum oxide.

Alternatively to the described composition of the reduction catalyst, it can also contain one or more zeolites that are charged or exchanged with copper and/or iron and optionally also with cerium or molybdenum. A mixture of the titanium dioxide-containing composition with the zeolite-containing composition is also possible.

The compositions known from the prior art are suitable for the hydrolysis and reduction catalysts that are used in the catalysts in accordance with the invention. In particular, titanium dioxide, aluminum oxide, silicon dioxide, zirconium dioxide or their mixed phases and compounds with each other are used as hydrolysis catalysts. Oxides of pentavalent and hexavalent elements like $SO_3$, $WO_3$, $Nb_2O_5$ and $MoO_3$ can be employed as stabilizers and to increase the activity.

With the reducing activity of the SCR catalyst there is always a potential for the formation of nitrous oxide by oxidation gas by oxidation of the ammonia. This formation is essentially catalyzed by the additional components of the reduction catalyst, especially by vanadium pentoxide. The formation of nitrous oxide increases with increasing exhaust gas temperature and will be the greater, the higher the partial pressure of the ammonia. To reduce the formation of nitrous oxide, one particular embodiment of the catalyst called for the active component vanadium pentoxide to be applied with increasing concentration along the reduction catalyst. In the simplest case a stepwise distribution of concentration is sufficient since this can be produced, for example, by the appropriate impregnation of the reduction catalyst with vanadium pentoxide precursors. Accordingly, a low concentration of vanadium pentoxide is thus called for in the inlet side portion of the catalyst, since here the partial pressure of ammonia and the exhaust gas temperature as well are still high. With increasing distance from the inlet phase the partial pressure of the ammonia decreases because of the reaction with the nitrogen oxides. For this reason the concentration of vanadium pentoxide here can be increased so as to achieve good conversion rates still even with the already reduced partial pressures of the ammonia and nitrogen oxides. The increased concentration of vanadium oxide is preferably applied over a length of 10 to 90% of the honeycomb starting from the outlet face. Advantageously, the two said measures are combined with each other, i.e., the hydrolysis catalyst is applied only in the front region, while the concentration of vanadium pentoxide is increased in the complimentary rear region of the reduction catalyst.

BRIEF DESCRIPTION OF DRAWINGS

The present invention will be further understood with reference to the accompanying drawings, wherein.

DETAILED DESCRIPTION OF THE INVENTION

The present invention will now be described in further detail.

Figure 1:
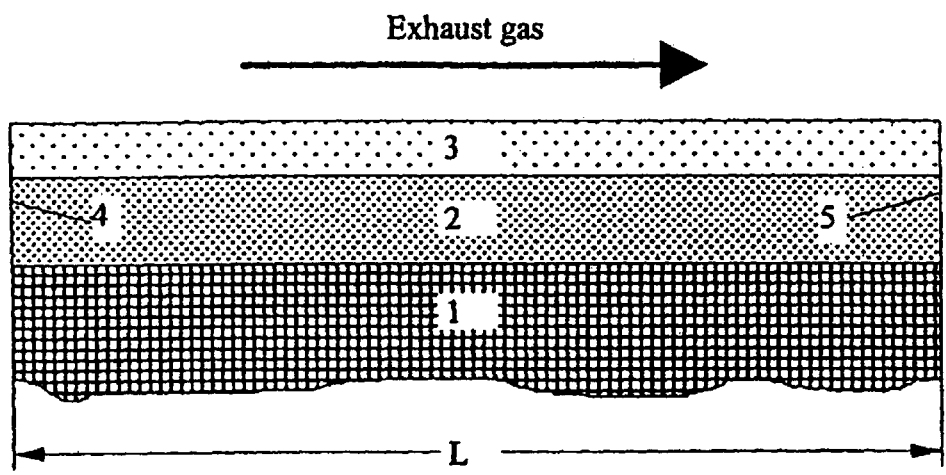
FIG. 1 is a schematic representation of the construction of the structured catalyst of the present invention made of two superimposed layers.
Figure 2:
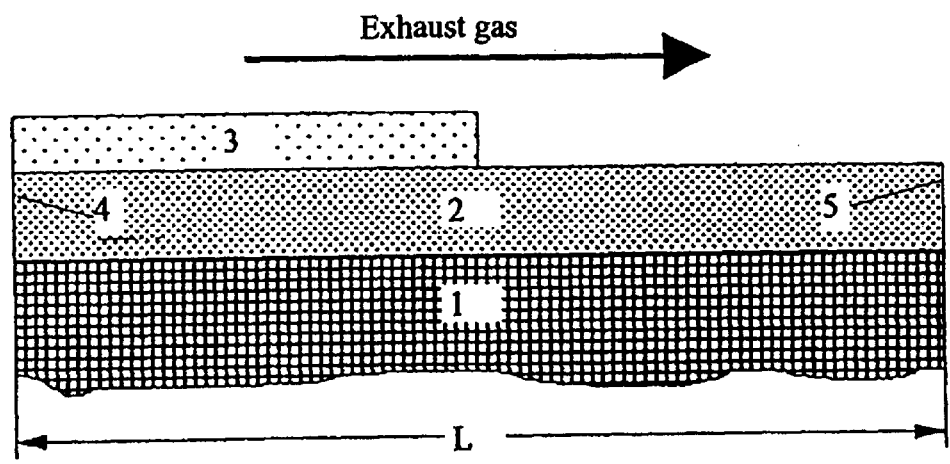
FIG. 2 is a schematic representation of the construction of the structured catalyst of the present invention of two superimposed layers, where the upper layer is applied only in a partial region.
Figure 3:
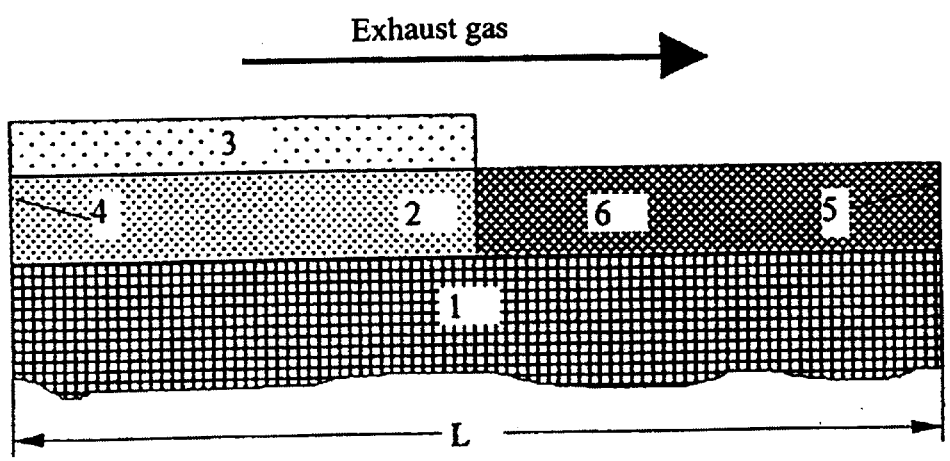
FIG. 3 is a schematic representation of shows the construction of the structured catalyst made of a total of three different catalytically active zones.

FIGS. 1 to 3 show some embodiments of the invention for the case that the hydrolysis catalyst and reduction catalyst are applied in the form of superimposed layers onto the channel walls of the flow channels of the honeycomb. In the figures there is shown a schematic representation of the structured catalyst including a channel wall (1) of the inert honeycomb, a reduction layer (2) and a hydrolysis layer (3), which stands in direct contact with the exhaust gas. The honeycomb has an inlet face (4) and an outlet face (5). In FIG. 1 both coatings are uniformly applied over the entire length L of the honeycomb. FIG. 2, in contrast, shows an embodiment in which the hydrolysis layer (3) is applied only over 50% of the length of the honeycomb starting from the inlet face. FIG. 3 shows the same arrangement as FIG. 2, but the rear half of the reduction layer was additionally coated with, for example, vanadium pentoxide (6).

The coating concentrations necessary to fulfill the task of catalysis are between about 50 and 250 grams of catalysis per liter of catalyst body (g/l) for the reduction catalyst. The hydrolysis catalyst is used in concentrations from 10 to 160, preferably 40 to 120 g/l. Below 10 g/l the hydrolysis activity is to low, while above 160 g/l the reduction layer lying under the hydrolysis layer can no longer fully develop its activity.

An aqueous coating dispersion was prepared from the powdered coatings to make the coatings. The inert carrier can be provided with a layer of the corresponding substances, for example, by immersion into this coating dispersion. After application of the coating dispersion the coating is dried and is usually calcined at temperatures between 200 and 600° C. for a time of 1–5 h. After this, additional active components can be applied to the coating by impregnation with solutions of suitable precursor compounds. The techniques that are used in this case are well known to the specialist. After the application of the first reduction layer the hydrolysis catalyst is applied in the same way.

The hydrolysis layer can also be applied to the face of the inlet face by spraying it one or more times. In this case the coating concentration of the hydrolysis catalyst decreases continuously from the inlet phase along the catalyst body until it is zero.

By varying the amount of coating or by controlled spraying of selected regions of the face, which is exposed to a high aerosol or exhaust gas load in operation, the concentration of the coating of the hydrolysis layer can be matched to the distribution of the aerosol of the compound that can be hydrolyzed to ammonia over the cross section of the exhaust gas stream. In each case according to the case of application, it can be enough to coat only about 10 to 90% of the inlet face with the hydrolysis catalyst.

High-surface-area materials like active aluminum oxides and titanium dioxide in anatase form with specific surfaces (measured in accordance with DIN 66132) between 40 and 300 m²/g are preferably used as powdered solids. Aluminum oxide and titanium oxide can be thermally stabilized by suitable additions such as lanthanum oxide, barium oxide, tungsten oxide, silicon oxide, molybdenum oxide and niobium oxide. Suitable materials are commercially available.

In applying the hydrolysis layer care must be taken that this layer allows sufficient diffusion of the nitrogen oxides to the reduction layer. Optionally, the porosity of this top layer can be increased by adding particularly coarse solids or other pore-forming agents.

The following examples serve for further illustration of the invention. The materials listed below were used to make the catalysts. The precise composition of the catalyst can be found in Table 1.

| Oxide Materials: | |
|---|---|
| $TiO_2$: | anatase; BET surface > 80 $m^2/g$ (DT 51 from Rhone Poulenc) |
| $TiO_2/WO_3$: | titanium dioxide stabilized with 10 wt % tungsten oxide (DT52 from Rhone Poulenc) |
| $Al_2O_3$: | λ-aluminum oxide; BET surface 140 $m^2/g$ |
| $SiO_2$: | pyrogenic silicon dioxide (Degussa) |
| $ZrO_2$: | sulfatized zirconium oxide |
| $Al_2O_3/SiO_2$: | aluminum silicate with 5 wt % silicon dioxide; BET surface > 120 $m^2/g$ |
| Fe-ZSM5: | 1.1 wt % $Fe_2O_3$; modulus = 28 |
| Fe mordenite: | 1.5 wt % $Fe_2O_3$; modulus = 30 |
| Precursor compound for: | |
| $WO_3$: | ammonium metatungstate |
| $V_2O_5$: | vanadyl oxalate; vanadyl sulfate, ammonium metavanadate |
| $Nb_2O_5$: | niobium-ammonium complex (AD1248, CBMM Company) |
| $MoO_3$: | ammonium polymolybdate |
| Honeycomb: | |
| Type A: | honeycomb of cordierite with 2.54 cm diameter, 7.62 cm length, 62 $cm^{-2}$ cell density and wall thickness of 0.2 mm |
| Type B: | honeycomb of cordierite with 2.54 cm diameter, 7.62 cm length, 140 $cm^{-2}$ cell density and wall thickness of 0.08 mm |
| Type C: | honeycomb of cordierite with 2.54 cm diameter, 7.62 cm length, 125 $cm^{-2}$ cell density and wall thickness of 0.03 mm |

EXAMPLE 1

An aqueous coating dispersion with a solid content of 40 wt % was prepared to produce the catalyst K1 in accordance with the invention. The dispersion contained 80 wt % titanium dioxide and 20 wt % aluminum oxide, with respect to dry weight. Then a honeycomb of Type A was coated with the oxide mixture by immersing it in the coating dispersion, after which it was dried in a stream of air at 120° C. and calcined in air for one hour at 500° C. The coating concentration applied in this way was 160 g/l of honeycomb.

In a second step the coated honeycomb was coated with 5 g $V_2O_5$ per liter, 26 g $WO_3$/l and 3 g $Nb_2O_5$/l. For this the honeycomb was impregnated with a solution of the precursor compound vanadyl oxalate, ammonium metatungstate and niobium-ammonium complex. The impregnated oxide precursors were decomposed after air drying at 120° C. in a stream of air at 500° C. over a period of one hour. This completed the preparation of the reduction layer.

In another step the honeycomb was coated again with an oxide coating (hydrolysis layer) of $TiO_2/WO_3$ (80 wt %) and aluminum oxide (20 wt %) by means of a second coating dispersion. The amount of coating applied in this step was 60 g/l of support. Then the coating was dried in a stream of air for 30 min at 120° C. and calcined for a period of one hour at 500° C. in air.

EXAMPLE 2

To make catalyst K2 in accordance with the invention, a titanium oxide powder was first impregnated with vanadyl sulfate corresponding to a $V_2O_5$ content of 5 wt % by the method of pore volume impregnation. The impregnated material was dried for 15 h at 120° C. and then calcined for 3 h at 400° C. in air.

The resulting $TiO_2/V_2O_5$ powder was processed with aluminum oxide to form a coating dispersion (80 wt % $TiO_2/V_2O_5$ and 20 wt % $Al_2O_3$) and applied in a concentration of 160 g/l to a honeycomb. The oxide coating was dried for 30 min at 120° C. in a stream of air and then calcined for 1 h at 500° C. in air and then calcined for 1 h at 500° C. in air.

To prepare the reduction layer, the honeycomb was coated with 26 g $WO_3$ per liter (from ammonium metasulfate) and 3 g $Nb_2O_5$/l (from niobium-ammonium complex) by impregnation with soluble precursors. The decomposition of the impregnated oxide precursors took place, after drying at 120° C. in a stream of air, at 500° C. for 1 h.

In another step the hydrolysis layer described in Example 1 was applied.

EXAMPLE 3

To make the catalyst K3 in accordance with the invention, $TiO_2/WO_3$ was impregnated with a $V_2O_5$ content of 3.2 wt % by spraying with an alkaline (pH=8 to 11) solution of ammonium metavanadate in a mixer. The resulting wet powder was then calcined in air for 3 h at 400° C. Then a honeycomb support was coated with the oxide mixture of $TiO_2/V_2O_5/WO_3$ (80 wt %) and aluminum oxide (20 wt %) (reduction layer). The amount of coating applied in this way was 180 g/l of support. The oxide coating was dried in a stream of air for 30 min at 120° C. and then calcined in air for 1 h at 500° C.

In another step the hydrolysis layer described in Example 1 was applied.

EXAMPLE 4

To make the catalyst K4 in accordance with the invention, first $La_2O_3$-stabilized titanium dioxide (10 wt % $La_2O_3$) was impregnated by the pore volume impregnation method with vanadyl oxalate corresponding to a $V_2O_5$ content of 3.2 wt % and with ammonium metatungstate corresponding to a $WO_3$ content of 10 wt %. The impregnating material was dried for 15 h at 120° C. and then calcined in air for 3 h at 400° C.

Then a honeycomb support was coated with the oxide mixture of $TiO_2/V_2O_5/WO_3/La_2O_3$ (80 wt %) and aluminum oxide (20 wt %) (reduction layer). The applied amount of coating was 180 g/l of support. The oxide coating was dried in a stream of air for 30 min at 120° C. and then calcined in air for 1 h at 500° C.

The hydrolysis layer described in Example 1 was applied in another step.

EXAMPLE 5

To make the catalyst K5 in accordance with the invention, first titanium dioxide was impregnated by pore volume impregnation with ammonium polymolybdate corresponding to an $MoO_5$ content of 5.5 wt %. The impregnated material was dried for 15 h at 120° C. and then calcined in air for 4 h at 480° C.

Then a honeycomb support was coated with the oxide mixture of $TiO_2/MoO_3$ (80 wt %) and aluminum oxide (20 wt %) (reduction layer) the applied amount of coating was 180 g/l of support. The oxide coating was dried in a stream of air for 30 min at 120° C. and then calcined in air for 4 h at 300° C.

In a second step the coated support was then impregnated with 5 g $V_2O_5$ (from vanadyl oxalate) and 3 g ($Nb_2O_5$ (from niobium-ammonium complex) per liter of support. The impregnated oxide precursors were decomposed, after air drying at 120° C. in a stream of air for 2 h at 500° C.

In another step the hydrolysis layer described in Example 1 was applied.

EXAMPLE 6

Another catalyst was made as in Example 3 (catalyst K6). The coating amounts of the reduction layer and the hydrolysis, however, were each adjusted to 120 g/l of support.

EXAMPLE 7

A support was provided with the reduction layer of Example 3. A hydrolysis layer of titanium dioxide (80 wt %) and aluminum oxide (20 wt %) was applied to this layer (catalyst K7). The amount of coating applied in this step was 60 g/l. Then the coating was dried in a stream of air for 30 min at 120° C. and calcined in air for 1 h at 500° C.

EXAMPLE 8

A support was provided with the reduction layer of Example 3. A hydrolysis layer of aluminum silicate was applied to this layer (catalyst K8). The amount of coating was 60 g/l of support. Then the coating was dried in a stream of air for 30 min at 120° C. and calcined in air for 2 h at 300° C.

EXAMPLE 9

A support was provided with the reduction layer of Example 3. A hydrolysis layer of aluminum silicate and $TiO_2/WO_3$ in a 1:1 ratio by weight was applied to this layer. The amount of coating of the hydrolysis layer was 60 g/l of support. Then the coating was dried in a stream of air for 30 min at 120° C. and calcined in air for 2 h at 300° C.

EXAMPLE 10

A support was provided with the reduction layer of Example 3. A hydrolysis layer of sulfatized zirconium oxide (80 wt %) and aluminum oxide (20 wt %) was applied to this layer. The amount of coating was 60 g/l of support. Then the coating was dried in a stream of air for 30 min at 120° C. and calcined in air for 2 h at 500° C.

EXAMPLE 11

A support was provided with the reduction layer of Example 3. A hydrolysis layer of high surface area silicon dioxide (Aerosil®; 80 wt %) and aluminum oxide (20 wt %) was applied to this layer. The amount of coating was 60 g/l of support. Then the coating was dried in a stream of air for 30 min at 120° C. and calcined in air for 2 h at 500° C.

EXAMPLE 12

Another catalyst was made in accordance with Example 3. A ceramic honeycomb of Type B was used as support.

EXAMPLE 13

Another catalyst was prepared as in Example 3. A metallic honeycomb of Type C was used as support.

EXAMPLE 14

Another catalyst was prepared as in Example 3. The hydrolysis layer, however, was applied only over 50% of the length of the support starting from the inlet face of the honeycomb.

EXAMPLE 15

Another catalyst was prepared as in Example 1. After calcining the hydrolysis layer the catalyst was coated in an additional step with 0.5 g $V_2O_5$ (from vanadyl oxalate) per liter of support only over 50% of the length of the honeycomb starting from the outlet face. The impregnated oxide precursors were decomposed, after drying at 120° C. in a stream of air, for 1 h at 500° C.

EXAMPLE 16

Another catalyst was prepared in accordance with Example 3. However, the reduction layer was additionally post-impregnated in an additional step with 2 g $V_2O_5$/l of support (from vanadyl oxalate) over 50% of the length of the honeycomb starting from the exit face. The hydrolysis layer was applied only over 50% of the length of the honeycomb starting from the inlet face. The impregnated oxide precursors were decomposed, after drying at 120° C. in a stream of air for 1 h at 500° C.

EXAMPLE 17

A $TiO_2/WO_3/V_2O_5$ complete extrudate with a cell density of 31 cells per $cm^2$ and a wall thickness of 0.35 mm was coated with a coating of $TiO_2/WO_3$ (80 wt %) and aluminum oxide (20 wt %) (hydrolysis layer) for catalyst K17 in accordance with the invention. The amount of coating applied in this step was 60 g/l of support. Then the coating was dried in a stream of air at 30 min at 120° C. and calcined in air for 2 h at 500° C.

EXAMPLE 18

To produce the catalyst K18 in accordance with the invention, an aqueous coating suspension with a solids content of 40 wt % was prepared. The dispersion contained, with respect to dry weight, 80 wt % Fe ZSM-5 (modulus 28, 1.1 wt % $Fe_2O_3$) and 20 wt % aluminum oxide. Then a honeycomb of Type A was coated with the oxide mixture by immersing it in the coating suspension and it was then dried at 120° C. in a stream of air. This was followed by a 4-hour calcination at 300° C. in air. The amount of coating applied in this way (reduction layer) was 180 g/l of support.

In an additional step the support was coated with the hydrolysis layer in accordance with Example 1. The amount of coating applied in this step was 60 g/l of support.

EXAMPLE 19

To prepare the catalyst K19 in accordance with the invention, an aqueous coating dispersion with a solids content of 40 wt % was prepared. The dispersion contained, with respect to dry, 80 wt % Fe mordenite (modulus 30, 1.5 wt % $Fe_2O_3$) and 20 wt % aluminum oxide. Then a honeycomb was coated with the oxide mixture by immersing it in the coating dispersion and drying it in a stream of air at 120° C. This was followed by a 4-hour calcination at 300° C. in air. The amount of coating applied in this way (reduction layer) was 120 g/l of support.

In an additional step the coated support was again provided with an oxide coating of aluminum silicate (hydrolysis layer). The amount of coating applied in this step was 80 g/l of support. Then the coating was dried in a stream of air for 30 min at 120° C. and calcined for 2 h at 300° C. in air.

EXAMPLE 20

An additional catalyst was prepared as in Example 1. After calcination of the reduction layer the face of the catalyst body was coated in an additional step with an oxide coating (hydrolysis layer) of $TiO_2/WO_3$ (80 wt %) and aluminum oxide (20 wt %). The coating dispersion was sprayed evenly over the entire inlet face by means of a paint spray gun. The amount of coating applied in this step was 40 g/l of support with respect to the sprayed element of volume. Then the coating was dried for 30 min for 120° C. in a stream of air and calcined for a period of 1 h at 500° C. in air.

EXAMPLE 21

An additional catalyst was prepared as in Example 22. After drying the hydrolysis layer the face of the catalyst was sprayed again in an additional step with the coating dispersion for the hydrolysis layer. However, a template was used to coat only a central region of the inlet face (about 50% of the total area). The amount of coating applied in this step was 20 g/l of support with respect to the sprayed element of volume. Then the coating was dried in a stream of air for 30 min at 120° C. and calcined in air for a period of 1 h at 500° C.

EXAMPLE 22

An additional catalyst as in Example 1 was prepared. After calcining the reduction layer, the face of the catalyst body was again coated in an additional step with an oxide coating (hydrolysis layer) of $TiO_2/WO_3$ (80 wt %) and aluminum oxide (20 wt %). The additional coating was applied by brief immersion of the catalyst body in the coating dispersion and then blowing it out from the outlet face. The depth of immersion was only 10 millimeters. The amount of coating applied in this step was 30 g/l of support with respect to the coated element of volume. Then the coating was dried in a stream of air for 30 min at 120° C. and calcined in air for a period of 1 h at 500° C.

Further variations and modifications of the foregoing will be apparent to those skilled in the art and are intended to be encompassed by the claims appended hereto.

German priority application 100 22 842.9 is relied on and incorporated herein by reference.

TABLE 1

Composition of prepared catalyst of the comparison example and Examples 1 to 19 in accordance with the invention -H: hydrolysis layer; -R: reduction layer; the concentration data are rounded off to whole grams.

| Example | $TiO_2$ [g/l] | $Al_2O_3$ [g/l] | $V_2O_5$ [g/l] | $WO_3$ [g/l] | Additives [g/l] | | Coating [g/l] | Total load [g/l] | Comment |
|---|---|---|---|---|---|---|---|---|---|
| K1-H | 43 | 12 | | 5 | | | 60 | 254 | $TiO_2/WO_3 + Al_2O_3$ |
| K1-R | 128 | 32 | 5 | 26 | 3 $Nb_2O_5$ | | 194 | | $(TiO_2 + Al_2O_3)/WO_3/V_2O_5/Nb_2O_5$ |
| K2-H | 43 | 12 | | 5 | | | 60 | 249 | Like K1-H |
| K2-R | 122 | 32 | 6 | 26 | 3 $Nb_2O_5$ | | 189 | | $(TiO_2/V_2O_5 + Al_2O_3)/WO_3/Nb_2O_5$ |
| K3-H | 43 | 12 | | 5 | | | 60 | 240 | Like K1-H |
| K3-R | 125 | 36 | 5 | 14 | | | 180 | | $TiO_2/WO_3/V_2O_5 + Al_2O_3$ |
| K4-H | 43 | 12 | | 5 | | | 60 | 240 | Like K1-H |
| K4-R | 112 | 36 | 5 | 14 | 13 $La_2O_3$ | | 180 | | $TiO_2/La_2O_3/WO_3/V_2O_5 + Al_2O_3$ |
| K5-H | 43 | 12 | | 5 | | | 60 | 248 | Like K1-H |
| K5-R | 136 | 36 | 5 | | 3 $Nb_2O_5$ | 8 $MoO_3$ | 188 | | $(TiO_2/MoO_3 + Al_2O_3)/V_2O_5/Nb_2O_5$ |
| K6-H | 86 | 24 | | 10 | | | 120 | 240 | 2 * K3-H |
| K6-R | 83 | 24 | 3 | 10 | | | 120 | | 2/3 * K3-R |
| K7-H | 48 | 12 | | | | | 60 | 240 | $TiO_2 + Al_2O_3$ |
| K7-R | 125 | 36 | 5 | 14 | | | 180 | | Like K3-R |
| K8-H | | 57 | | | 3 $SiO_2$ | | 60 | 240 | $Al_2O_3/SiO_2$ |
| K8-R | 125 | 36 | 5 | 14 | | | 180 | | Like K3-R |
| K9-H | 27 | 28 | | 3 | 2 $SiO_2$ | | 60 | 240 | $Al_2O_3/SiO_2 + TiO_2/WO_3$ |
| K9-R | 125 | 36 | 5 | 14 | | | 180 | | Like K3-R |
| K10-H | 0 | 12 | | | 48 $ZrO_2$ | | 60 | 240 | $ZrO_2 + Al_2O_3$ |
| K10-R | 125 | 36 | 5 | 14 | | | 180 | | Like K3-R |
| K11-H | | 12 | | | 48 $SiO_2$ | | 60 | 240 | $SiO_2 + Al_2O_3$ |
| K11-R | 125 | 36 | 5 | 14 | | | 180 | | Like K3-R |
| K12-H | 43 | 12 | | 5 | | | 60 | 240 | Like K3, but on ceramic honeycomb Type B |
| K12-R | 125 | 36 | 5 | 14 | | | 180 | | |
| K13-H | 43 | 12 | | 5 | | | 60 | 240 | Like K3, but on metal honeycomb Type C |
| K13-R | 125 | 36 | 5 | 14 | | | 180 | | |
| K14-H | 43 | 12 | | 5 | | | 60 | 240 | Like K3-H, but only over 50% of the length from the inlet face |
| K14-R | 125 | 36 | 5 | 14 | | | 180 | | Like K3-R |
| K15-H | 43 | 12 | | 5 | | | 60 | 254 | Like K1, but post-impregnated with 0.5 g/l $V_2O_5$ over 50% of the length from the outlet face |
| K15-R | 128 | 32 | 5 | 26 | 3 $Nb_2O_5$ | | 194 | | |
| K16-H | 43 | 12 | | 5 | | | 60 | 242 | Like K3-H, but only over 50% of the length from the inlet face |
| K16-R | 125 | 36 | 5 + 2 | 14 | | | 182 | | Like K3-R, but post impregnated with 2 g/l $V_2O_5$ over 50% of the length from the outlet face |
| K17-H | 43 | 12 | | 5 | | | 60 | | Like K1-H |
| K17-R | | | | | Complete catalysts | | | | $TiO_2 + WO_3 + V_2O_5$ complete extrudate |
| K18-H | 42.5 | 12 | 0.5 | 5 | | | 60 | 240 | $TiO_2/WO_3/V_2O_5 + Al_2O_3$ |
| K18-R | | 36 | | | 144 ZSM5 | | 180 | | Reduction catalyst with Fe-ZSM5 |

TABLE 1-continued

Composition of prepared catalyst of the comparison example and Examples 1 to 19 in accordance with the invention -H: hydrolysis layer; -R: reduction layer; the concentration data are rounded off to whole grams.

| Example | $TiO_2$ [g/l] | $Al_2O_3$ [g/l] | $V_2O_5$ [g/l] | $WO_3$ [g/l] | Additives [g/l] | | Coating [g/l] | Total load [g/l] | Comment |
|---|---|---|---|---|---|---|---|---|---|
| K19-H | | 76 | | | 4 $SiO_2$ | | 80 | 220 | $Al_2O_3/SiO_2$ as H-catalyst |
| K19-R | | 28 | | | 112 | Mordenite | 140 | | Reduction catalyst with Fe-mordenite |

We claim:

1. A structured catalyst for selective reduction of nitrogen oxides contained in the lean exhaust gas of a combustion engine by ammonia using a compound that can be hydrolyzed to ammonia, which is injected into the exhaust gas stream in the form of an aerosol, comprising:
   a monolithic catalyst body, having a plurality of flow paths for the exhaust gas from an inlet face to an outlet face of said monolithic catalyst body, wherein the flow paths are formed by parallel channels regularly arranged over a cross section of the catalyst body and bounded by channel walls;
   said monolithic catalyst body containing a reduction catalyst for selective reduction of nitrogen oxides by means of ammonia and a hydrolysis catalyst for hydrolysis of the compound that can be hydrolyzed to ammonia, wherein said reduction catalyst:
   (i) is an extruded complete catalyst and forms the monolithic catalyst body and the hydrolysis catalyst is applied as a coating on said channel walls; or,
   (ii) said monolithic catalyst body is formed by an inert honeycomb body and the reduction catalyst and hydrolysis catalyst are applied as superimposed coatings onto the channel walls of the catalyst body with the reduction catalyst being the first layer on the channel walls and the hydrolysis catalyst lying on the reduction catalyst as the second layer.

2. The catalyst according to claim 1, wherein the hydrolysis catalyst is applied to the channels walls of the flow channels only over 10 to 70% of the length of the honeycomb starting from said inlet face.

3. The catalyst according to claim 2, wherein the reduction catalyst contains the following components:
   1) titanium oxide;
   2) at least one oxide selected from the group consisting of tungsten, niobium, molybdenum, silicon, boron, aluminum, phosphorus, zirconium, barium, yttrium, lanthanum, cerium and mixed oxides of these and of mixtures with titanium oxide; and
   3) at least one oxide of vanadium, iron or copper.

4. The catalyst according to claim 2, wherein the reduction catalyst contains one or more zeolites, which can be charged with copper and/or iron and optionally also with cerium or molybdenum.

5. A process for the purification of the exhaust gas from a combustion engine comprising passing the exhaust gas in contact with the catalyst of claim 2.

6. The catalyst according to claim 1, wherein the reduction catalyst and hydrolysis catalyst are applied in the form of superimposed coatings onto an inert honeycomb, where the flow paths are formed by parallel flow channels regularly arranged over the cross section of the honeycomb and bounded by channel walls and the reduction catalyst forms the first layer lying on the channel walls of the flow channels and hydrolysis catalyst lies on the reduction catalyst as the second layer.

7. The catalyst according to claim 6, wherein the hydrolysis catalyst is applied to the channels walls of the flow channels only over 10 to 70% of the length of the honeycomb starting from said inlet face.

8. The catalyst according to claim 6, wherein the reduction catalyst contains the following components:
   1) titanium oxide;
   2) at least one oxide selected from the group consisting of tungsten, niobium, molybdenum, silicon, boron, aluminum, phosphorus, zirconium, barium, yttrium, lanthanum, cerium and mixed oxides of these and of mixtures with titanium oxide; and
   3) at least one oxide of vanadium, iron or copper.

9. The catalyst according to claim 1, wherein the reduction catalyst contains the following components:
   1) titanium oxide;
   2) at least one oxide selected from the group consisting of tungsten, niobium, molybdenum, silicon, boron, aluminum, phosphorus, zirconium, barium, yttrium, lanthanum, cerium and mixed oxides of these and of mixtures with titanium oxide; and
   3) at least one oxide of vanadium, iron or copper.

10. The catalyst according to claim 9, wherein the titanium oxide is present up to 30 to 100 wt % in the anatase modification with a specific surface area greater than 40 $m^2/g$.

11. The catalyst according to claim 10, wherein the titanium oxide is stabilized with 1 to 20 wt % tungsten oxide, molybdenum oxide, silicon oxide, molybdenum oxide, silicon oxide or lanthanum oxide.

12. The catalyst according to claim 11, wherein the reduction catalyst is additionally coated with vanadium oxide over the length of 10 to 90% from the outlet face of the honeycomb.

13. The catalyst according to claim 9, wherein the hydrolysis catalyst contains titanium dioxide, aluminum oxide, silicon dioxide, zirconium dioxide or their mixed phases and compounds with each other.

14. The catalyst according to claim 13, wherein the hydrolysis catalyst additionally contains at least one oxide selected from the group consisting of $SO_3$, $WO_3$, $Nb_2O_5$ and $MoO_3$.

15. The catalyst according to claim 13, wherein the coating concentration of the hydrolysis catalyst decreases continuously from the inlet face along the length of the catalyst body until it reaches zero concentration.

16. The catalyst according to claim 1, wherein the reduction catalyst contains one or more zeolites, which can be charged with copper and/or iron and optionally also with cerium or molybdenum.

17. The catalyst according to claim 1, wherein the reduction catalyst consists of a mixture of the reduction catalyst.

18. The catalyst according to claim 17, wherein only 10 to 90% of the inlet face is coated with the hydrolysis catalyst.

19. The catalyst according to claim 17, wherein only selected regions of the inlet face are coated with the hydrolysis catalyst.

20. The catalyst according to claim 17, wherein the inlet face of the catalyst body is coated with the hydrolysis catalyst corresponding to the distribution of the aerosol of the compound that can be hydrolyzed to ammonia over the cross section of the exhaust gas stream.

21. A process for the purification of the exhaust gas from a combustion engine comprising passing the exhaust gas in contact with the structural catalyst of claim 1.

* * * * *